UNITED STATES PATENT OFFICE.

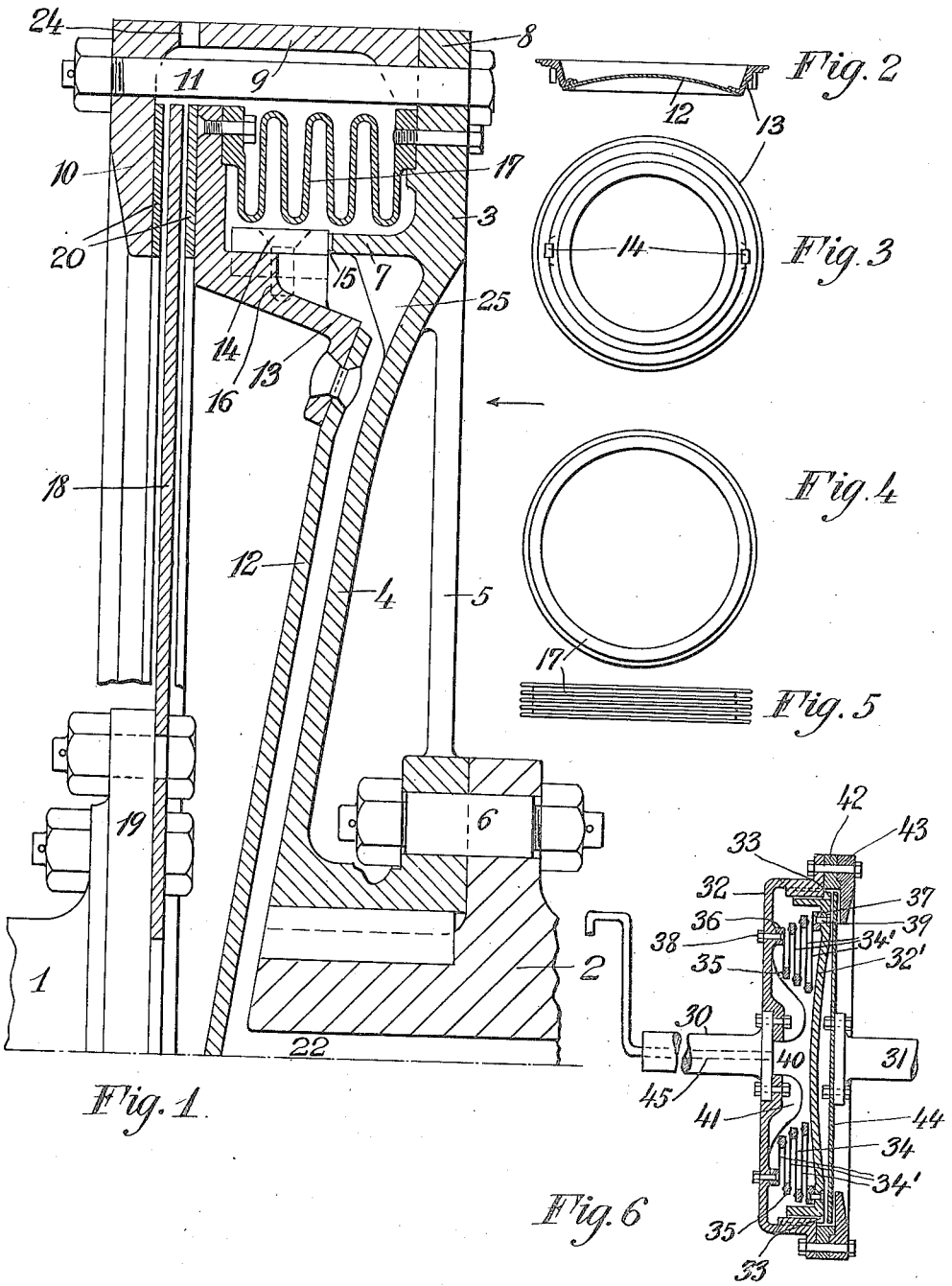

JOHN F. METTEN, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

CLUTCH.

1,157,793.   Specification of Letters Patent.   Patented Oct. 26, 1915.

Original applications filed August 4, 1911, Serial No. 642,301, and June 18, 1912, Serial No. 704,376. Divided in part and this application filed March 5, 1913. Serial No. 752,135.

*To all whom it may concern:*

Be it known that I, JOHN F. METTEN, a citizen of the United States, residing at Philadelphia, in the county of Philadelphia and State of Pennsylvania, have invented certain new and useful Improvements in Clutches, of which the following is a full, clear, and exact specification.

This invention relates to detachable driving connections for connecting shafts.

This application is a division in part of my application, Serial No. 704,376, filed June 18, 1912, and in part of its copending application, Serial No. 642,301, filed August 4, 1911 (now Patent No. 1,047,908).

The object of the invention is to provide apparatus of the character described which shall be capable of transmitting large powers, such, for instance, as are required to be transmitted from the prime movers to the propellers of steamships, which can be promptly and easily thrown into either connecting or disconnected position, and which is readily susceptible of control, automatic or otherwise.

In the accompanying drawings which illustrate the invention, Figure 1 is a vertical axial section of one-half of a clutch embodying the invention, this clutch being axially symmetrical and therefore the half section serves to illustrate the whole; Fig. 2 is a radial section of the slidable diaphragm as will be hereinafter referred to, upon a reduced scale; Fig. 3 is an elevation of the outer ring of the sliding head looking in the direction of the arrow; Fig. 4 is an elevation of the expansion ring which retracts the sliding head and incloses the fluid chamber; Fig. 5 is a side view of the expansion ring; and Fig. 6 is a vertical section of a modified form of clutch embodying the invention.

Referring to the drawings, and first to Figs. 1 to 5, inclusive, 1 and 2 represent the shafts to be connected. The clutch for connecting these shafts comprises a circular frame 3 bolted to a flange on the shaft 2. This frame has a concave web 4 and ribs as 5 may extend from the outer edge of this web to the hub or flange receiving the bolts 6 which secure the frame to the shaft 2. The frame also comprises a longitudinal flange 7 which extends inwardly from the outer edge of the web 4. Also from the outer edge of the concave web a radial flange 8 extends to the outer edge of the clutch. To this flange 8 is secured a gib, which gib comprises a longitudinal portion 9 and a radially extending flange or ring 10, the gib being secured to the frame by means of bolts 11 passing through the radial flange 8 and the gib ring 10. Within the frame and the gib is a diaphragm or head comprising a plate 12 of boiler plate or other suitable material, and a ring 13 secured to the outer edge of the plate 12 in such manner that the joint is water and oil tight. This may be accomplished by riveting the ring to the plate and calking the joint. Secured to the diaphragm ring 13 are projections or lugs 14 which extend into guiding grooves 15 formed in the longitudinal flange 7. The lugs may be secured in any suitable way to the diaphragm ring integrally or otherwise, but as shown they appear as secured by machine screws 16. Secured near the outer edge of the slidable head, that is, to the diaphragm ring 13, and extending entirely around the same, is an expansion ring 17 of wrought steel. This expansion ring is in one piece and is reflexed so that it is fluted or corrugated as shown and may be extended axially and possess resilience so that when released it will resume its original condition. The edge of this expansion ring which is opposite the diaphragm ring is secured to the radial flange 8 of the frame. The two edges of the expansion ring are respectively connected to the frame and sliding head or diaphragm entirely around the circumference by means of machine screws and pains is taken to make a fluid tight joint in each case. Between the radial portion of the gib or the gib ring, and the diaphragm ring 13 is interposed a flexible disk 18 which is bolted to a flange 19 upon the shaft 1. This disk may be made of saw steel of sufficient strength to transmit the power desired, and may also compensate for differences in alinement between the connected shafts, or to afford a certain degree of flexibility between the shafts for any reason. On the faces of the diaphragm ring and the gib ring which engage with the disk 18, friction material 20 may be employed, which material may be such as suitable for brake faces of heavy duty as, for instance, leather or material constituted of asbestos and wire.

It will now be apparent that a fluid tight chamber will be formed within the space inclosed by the expansion ring, the sliding head comprising the plate 12 and the ring 13, and the frame 3. Operating fluid, as oil or water, may be admitted to this chamber through a hole 22 extending axially through the shaft 2. It will now be apparent that when fluid is not forced into the chamber mentioned under pressure, the expansion ring will retract the sliding head and the driving connection between the two shafts will be released. If, however, fluid is supplied under pressure to the clutch chamber, the sliding head will be forced against the tension of the expansion ring and the disk will be frictionally gripped between the gib ring and the ring 13 of the sliding head. Driving connection will then be established between the two shafts. Fluid connection may be made with the clutch by having the hole 22 extend to the end of the shaft opposite the clutch where connection may be made to a supply pipe through a suitably packed joint. This supply pipe may receive fluid pressure from any suitable source and the pressure within the clutch may be controlled by a suitable cock which may be turned alternately to connect the supply pipe with the source of fluid pressure, when the clutch will be engaged, and to connect the supply pipe with a drain, when the pressure within the clutch will be released and the clutch disengaged. In some instances, it is desirable that the clutch should operate automatically to connect the shafts upon undue speed of the shaft to which the fluid chamber is secured. To accomplish this result, the supply pipe should be carried to an elevation higher than the fluid chamber in the clutch so that when the controlling cock is turned to open the drain, merely the pressure in the clutch will be relieved but the liquid will not be drained from the clutch. The clutch chamber being always full of liquid, if the shaft 2 attains an excessive speed, the centrifugal force acting upon the liquid in the clutch will cause it to press outwardly with great force, and, overcoming the tension of the expansion ring, move the sliding head so as to grip the disk and couple the shafts together. Holes 24 are placed in the outer surface of the gib for the purpose of permitting any liquid which may find its way inside the gib and outside the liquid chamber to drain off. Radial ribs 25 interposed between the web 4 and the flange 7 of the clutch strengthen the structure and also serve as blades projecting into the fluid in the chamber of the clutch and aid in causing the body of the liquid to be carried around with the clutch, which movement of the liquid results in the automatic operation by centrifugal action, as before referred to.

Referring to Fig. 6, the clutch for securing together the shafts 30 and 31 comprises a frame 32 which is bolted to a flange on the end of the shaft 30. Within the frame is fitted a head 32' which can slide axially in the frame but is secured against rotation with relation thereto by means of projections or keys 33 on the head which enter slots or key ways in the frame. The head 32' is attached to the frame by means of a flexible diaphragm or expansion ring 34 which is reflexed so that it is fluted or corrugated and may be extended axially and possess resilience so that when released it will resume its original condition. This expansion ring is shown in this structure as built up of thin annular plates 34' of spring metal spaced apart by rings 35, one being placed between each plate and the one adjacent to it and alternately at the inner and outer edges of the plates. The plates are riveted to each other through the rings so as to form fluid tight joints and the edges of the outside plates of the diaphragm are spaced from the head and frame respectively by rings 36 and 37, and are secured to the head and frame respectively so as to form fluid tight joints, by bolts or rivets 38 and 39 passing through the rings. There is thus formed a fluid tight chamber 40 within the expansion ring and between the frame 32 and the head 32'. The expansion ring will permit the head to move axially but will act as a spring tending to move the head into a position where the plates of the expansion ring are parallel to each other. Extending from the frame 32 into the fluid chamber 40 are wings or blades 41 which operate to carry around with the frame as it is rotated any fluid which may be within the chamber. Bolted to the frame 32 and spaced therefrom by a ring 42 is a gib ring 43. For convenience in assembling, both the gib ring 43 and the spacing ring 42 may be made in halves or otherwise sectioned. Within the gib ring is a disk 44 which is bolted to a flange on the shaft 31. If fluid under sufficient pressure fills the chamber 40 the head 32' will be forced against the disk 44 and the latter will be frictionally gripped between the head and the gib ring and the shafts 30 and 31 will be connected together so that one can drive the other. If now the pressure in the chamber is reduced to a point at which the retractile force of the expansion ring preponderates, the head will be retracted and the disk released. The clutch disk 44 is preferably thin enough so that it will flex into proper engagement with the head and gib ring and also provide a flexible connection to compensate for any slight inaccuracy in the alinement of bearings.

The fluid for operating the clutch is supplied to the chamber 40 through a hole 45 extending through the shaft 30. This fluid, such as water, oil, air or other suitable fluid, may be supplied from any suitable source. Fluid connection with the clutch may be made by connecting the supply pipe through a suitably packed joint with the hole 45 at the end of the shaft 30 opposite the clutch. The pressure within the clutch may be controlled by a suitable cock which may be turned alternately to connect the supply pipe with the source of fluid pressure when the clutch will be engaged and to connect the supply pipe with a drain when the pressure within the clutch will be released and the clutch disengaged. The fluid supply pipe should be carried to a point higher than the clutch chamber, for instance as shown in Fig. 6, so that the fluid will not drain out of the chamber but only such as is forced out by pressure will leave the clutch, the clutch chamber always remaining full. This causes prompt action of the clutch when the pressure is turned on and also permits of an automatic operation which is advantageous under some circumstances.

It will now be apparent that if fluid under pressure is supplied to the clutch chamber 40, pressure will be applied to the head 32. This head will be moved toward the disk 44 and against the tension of the built-up expansion ring. The disk will thus be gripped between the head 32 and the gib ring 43. It will be observed by this arrangement that the friction available for driving the disk is double the thrust exerted on the head on account of the two surfaces of the disk being subjected to the load. The key and slot arrangement between the frame 31 and the head 32 serves to transmit the driving force from the frame to the head, thus relieving the expansion ring of any torsional load. It will be seen that under these conditions the two shafts are securely clutched together. If now it is desired to released the clutch to disconnect the shafts, the controlling cock would be turned so as to connect the clutch chamber with the drain. As the fluid pressure is reduced below the tension exerted upon the head by the expansion ring, that tension will draw the head away from the disk, thereby releasing it.

In regard to the automatic operation of the clutch hereinbefore referred to as some times advantageous, it is some times desired that if the shaft to which the fluid chamber is connected shall exceed a certain speed this shall result in automatically clutching the two shafts together. Where the clutch remains full of fluid, if the shaft 30 should exceed a certain speed, the fluid which is rotated with the chamber (this action being facilitated by means of the wings 41) moves outwardly under centrifugal force, thereby creating a pressure between the head and the frame. This causes the head to move toward the gib ring 43 (when the retractile force of the expansion ring has been overbalanced) and the disk 44 is gripped as before described and the shafts are clutched together. When the shaft 30 is run at normal speed, any pressure between the frame and the head due to the centrifugal action of the oil and the clutch is insufficient to overcome the retractile force of the expansion ring and the clutch remains disengaged unless it is connected with the source of fluid pressure.

While the invention has been illustrated in what are considered its best applications, it will be understood that various changes and modifications may be made in the apparatus shown in the drawings, and the invention is not therefore limited to the structures shown in the drawings.

Having thus described my invention, I declare that what I claim as new and desire to secure by Letters Patent is:—

1. The combination with shafts to be connected, of a clutch for connecting the same comprising a gripping member secured to one of said shafts and a disk secured to the other of said shafts, said gripping member comprising relatively movable parts between which said disk extends, means for moving said parts to grip said disk and a longitudinally expansible and retractile one piece ring for separating the gripping parts.

2. The combination with two shafts to be connected, of a frame secured to one of said shafts, a gib ring secured to said frame, a disk secured to the other of said shafts and extending within said ring, a diaphragm ring adapted to grip said disk against said gib ring, a flexible diaphragm upon which said diaphragm ring is mounted and a longitudinally expansible and retractile one piece ring having one edge secured to said frame and the other edge to said diaphragm ring, said diaphragm, frame, diaphragm ring and expansible ring forming a liquid tight chamber having an opening for the admission of liquid.

3. The combination with two shafts to be connected, of a frame secured to one of said shafts, a gib ring secured to said frame, a disk secured to the other of said shafts and extending within said ring, a diaphragm ring adapted to grip said disk against said gib ring having projections engaging in slots in a flange extending from said frame to guide said diaphragm ring in its movement, a flexible diaphragm upon which said diaphragm ring is mounted and a longitudinally expansible and retractile one piece ring having one edge secured to said frame and the other to said diaphragm ring, said diaphragm, frame, diaphragm ring and expansible ring forming a liquid tight chamber having an opening for the admission of liquid, said expansible ring being located between the said guiding flange upon the said frame and the gib ring.

4. The combination with a shaft carrying a flexible power transmitting disk, of a hollow shaft carrying an axially fixed member adjacent one side of said disk and a movable member adjacent the opposite side, a plate carrying said movable member, an extensible bellows connecting said plate and the hollow shaft, and means for applying fluid pressure through said hollow shaft to said movable member to frictionally engage and flex said disk between said movable and fixed members.

5. The combination with a shaft carrying a flexible power transmitting disk, of a second shaft carrying an axially fixed member adjacent one side of said disk and a movable member adjacent the opposite side, said movable member comprising a diaphragm, a second stationary member keyed thereto and to said second shaft, and an expansible fluid retaining wall between said diaphragm and said stationary member, and means for applying fluid pressure to move said diaphragm and expand said wall whereby to engage and flex said disk between said axially fixed member and said movable diaphragm member.

6. The combination with a shaft carrying a flexible power transmitting disk, of a second shaft carrying an abutment on one side of said disk and a movable disk flexing member on the other, and a fluid pressure chamber for operating said member comprising a diaphragm supporting said movable member, a rigid member spaced from said diaphragm and keyed to said second shaft and said diaphragm, and an annular extensible bellows connecting said movable member and said rigid member on said second shaft.

7. The combination with a shaft carrying a power transmitting disk, of a second shaft carrying a rigid plate and a movable dished diaphragm adjacent said disk, a sliding interlocking connection between said rigid plate and said diaphragm, an extensible corrugated bellows connecting the periphery of said rigid plate and said movable diaphragm, and means for admitting fluid pressure between said plate and diaphragm to extend the bellows and bring the diaphragm and disk into frictional contact.

8. The combination with a shaft carrying a flexible disk, of an alined shaft having members engaging opposite faces of said disk, one of said members being axially movable relatively to the other member and said disk to engage and disengage said shafts by flexing said disk, driving means engaging said second shaft with said axially movable member, and means for retaining fluid pressure to control said movable member comprising an extensible bellows connecting said members.

9. The combination with a shaft carrying a power transmitting disk, of a second shaft carrying a rigid plate and a movable dished diaphragm adjacent said disk, a sliding interlocking connection between said rigid plate and said diaphragm within the fluid chamber, an extensible corrugated bellows connecting the periphery of said rigid plate and said movable diaphragm, and means for admitting fluid pressure between said plate and diaphragm to extend the bellows and bring the diaphragm and disk into frictional contact.

10. The combination with two shafts to be connected, of a frame mounted upon one of said shafts, a head slidable therein, a flexible retractile connection between said frame and said head and forming a fluid tight chamber between said head and said frame, a gib ring secured to said frame, and a disk secured to the other of said shafts, said disk extending between said head and said gib ring and adapted to be gripped between the same.

11. The combination with two shafts to be connected, of a frame mounted upon one of said shafts, a head engaging with said frame, said engagement permitting longitudinal sliding of said head in said frame but preventing rotation with relation thereto, a flexible retractile connection between said frame and said head and forming a fluid tight chamber between said head and said frame, a gib ring secured to said frame, and a disk secured to the other of said shafts, said disk extending between said head and said gib ring and adapted to be gripped between the same.

12. The combination with two shafts to be connected, of a frame mounted upon one of said shafts, a head slidable therein, a reflexed retractile connection between said frame and said head and forming a fluid tight chamber between said head and said frame, a gib ring secured to said frame, and a disk secured to the other of said shafts, said disk extending between said head and said gib ring and adapted to be gripped between the same.

13. The combination with shafts to be connected, of a clutch for connecting the same comprising a gripping member secured to one of said shafts and a disk secured to the other of said shafts, said gripping member comprising relatively movable parts between which said disk extends, means for moving said parts to grip said disk and a longitudinally expansible and retractile ring for separating the gripping parts.

14. The combination with two shafts to be connected, of a frame secured to one of said shafts, a gib ring secured to said frame, a disk secured to the other of said shafts and extending within said ring, a diaphragm ring adapted to grip said disk against said gib ring, a diaphragm upon which said diaphragm ring is mounted and a longitudinally expansible and retractile ring having one edge secured to said frame and the other edge to said diaphragm ring, said diaphragm, frame, diaphragm ring and expansible ring forming a liquid tight chamber having an opening for the admission of liquid.

15. The combination with two shafts to be connected, of a frame secured to one of said shafts, a gib ring secured to said frame, a disk secured to the other of said shafts and extending within said ring, a diaphragm ring adapted to grip said disk against said gib ring having projections engaging in slots in a flange extending from said frame to guide said diaphragm ring in its movement, a flexible diaphragm upon which said diaphragm ring is mounted and a longitudinally expansible and retractile ring having one edge secured to said frame and the other to said diaphragm ring, said diaphragm, frame, diaphragm ring and expansible ring forming a liquid tight chamber having an opening for the admission of liquid.

16. The combination with a shaft carrying a flexible power transmitting disk of a second shaft carrying a movable member adapted to engage and flex said disk, said movable member being flexibly mounted whereby to normally be separated from the surface of said disk, and means for applying power to move said movable member in opposition to its flexible mounting to engage and flex said disk.

In testimony whereof I affix my signature, in presence of two witnesses.

JOHN F. METTEN.

Witnesses:
FRANCIS L. CRAMP,
J. H. McMASTER.